Nov. 19, 1968 T. C. SODDY 3,411,261
INTERLOCKING PANEL STRUCTURE
Original Filed March 16, 1960 2 Sheets-Sheet 1
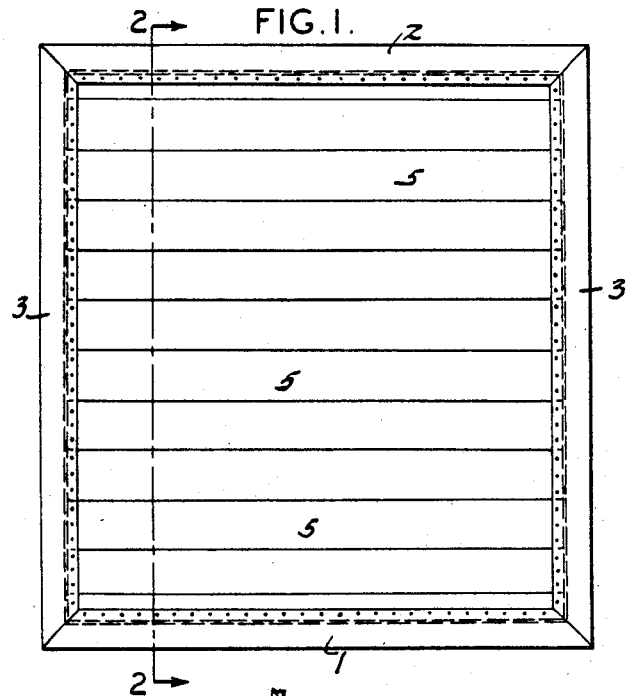
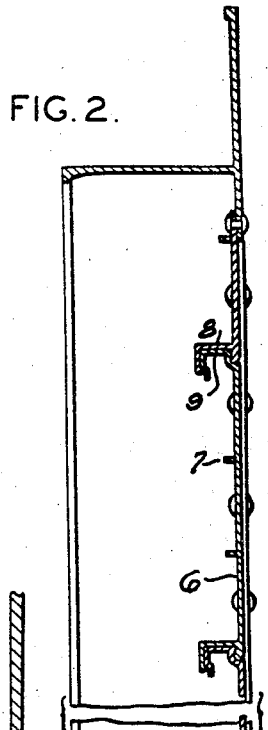
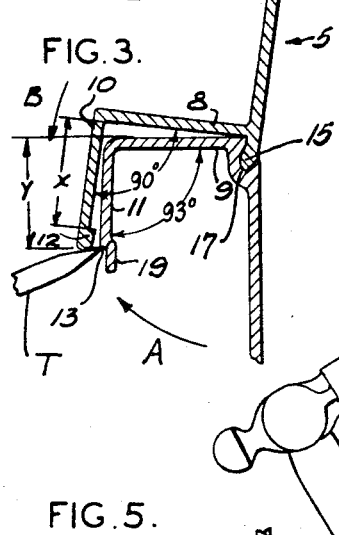
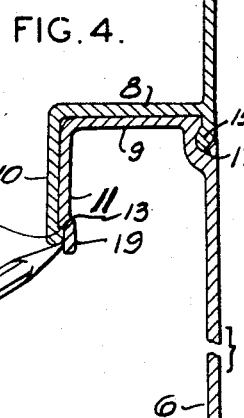
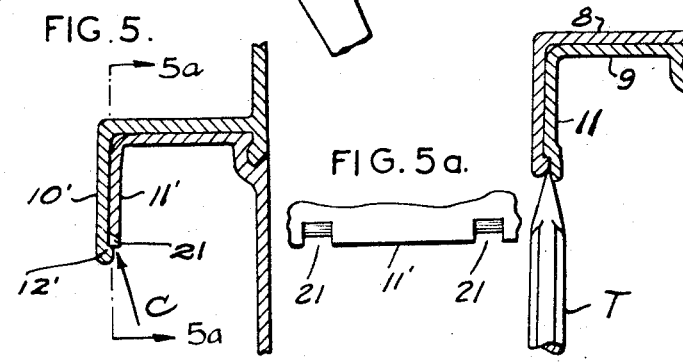
Inventor
Thomas C. Soddy
by Rodney Bedell
atty.

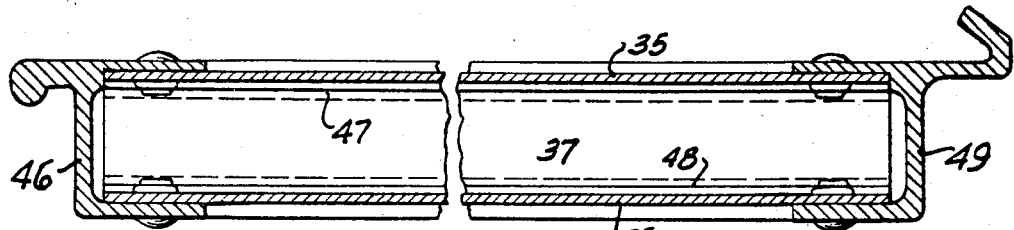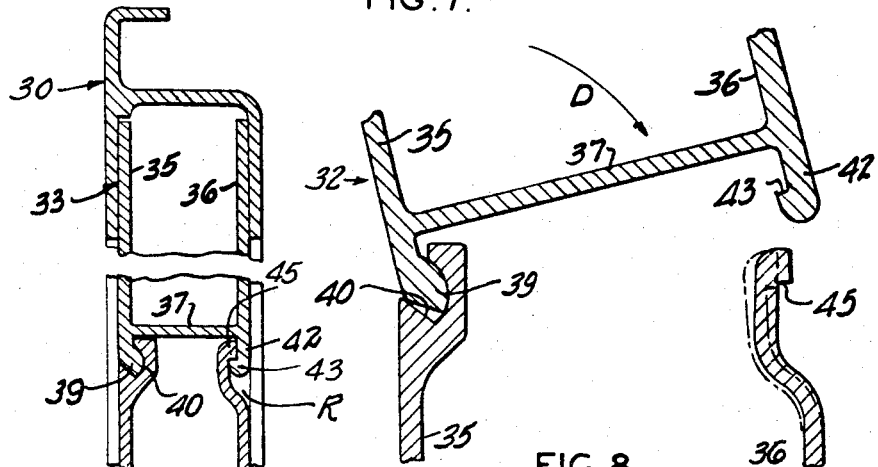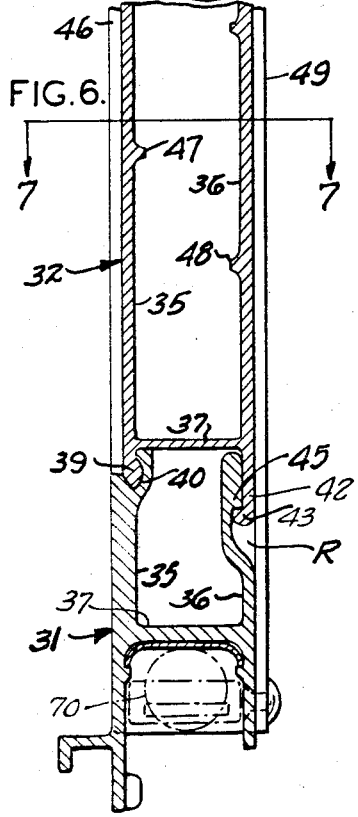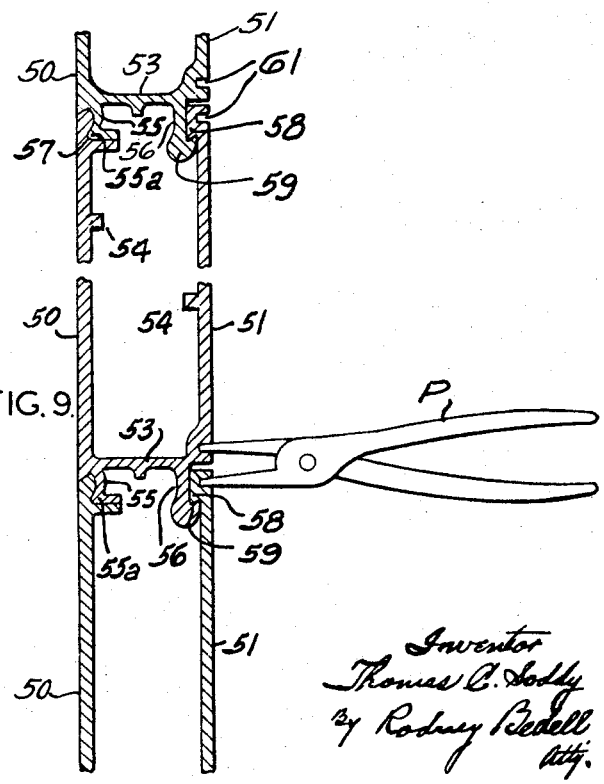

United States Patent Office 3,411,261
Patented Nov. 19, 1968

3,411,261
INTERLOCKING PANEL STRUCTURE
Thomas C. Soddy, Downers Grove, Ill., assignor, by mesne assignments, to Evans Products Company, Plymouth, Mich., a corporation of Delaware
Original application Mar. 16, 1960, Ser. No. 15,376, now Patent No. 3,203,149, dated Aug. 31, 1965. Divided and this application Aug. 30, 1965, Ser. No. 505,200
5 Claims. (Cl. 52—588)

This application is a division of my co-pending application Ser. No. 15,376, filed Mar. 16, 1960, now Patent No. 3,203,149.

The invention relates to the formation of wall-like structure by the use of substantially rigid elongated units of material extruded through a die. Each unit comprises a panel-like body with webs and flanges offset from the general plane of the body. For example, such sections may be formed of aluminum near its melting or softening temperature and are thus produced more economically than by rolling an aluminum billet, and may have acute angles not possible by a rolling operation.

Previously, interengaged abutting flanges of adjacent units have been secured to each other by riveting them together. A more recent innovation has involved the interlocking of internesting marginal portions of adjacent units by slightly distorting one or both of the interengaging parts along an elongated edge or margin to form an abutting face mechanical interlock which does not require riveting, welding, or other additional fastening means. This contributes to the economy and appearance of a structure so formed. However, such structures have been accompanied by the disadvantage that disassembly of adjacent units has required the practical destruction of the interlocked joint or such deformation of portions of the units as would negative reuse or, at best, detract from the appearance of the reassembled units. In some structures where repair, reassembly or replacement of one or more units is required, it may be as important to be able to disassemble units as it is to have a secure assembly. One example of such need is in the use of assembled extruded metal sections for constructing railway freight car doors which are subject to damaging conditions where a part of the door must be repaired.

One object of the present invention is to make possible the ready assembly of extruded units by an abutting mechanical marginal interlock which will avoid the necessity of securing the units together by riveting, welding, etc., and at the same time be subject to disassembly without destruction or undue distortion of the assembled units during or after assembly.

Another object is to form a double wall structure of extruded material sections in which an abutted mechanical interlock holds the units assembled and also provides for disassembly of the units without injury to them.

Another object is to form a rigid structure by interlocking units which cooperate, when assembled, to form a series of box sections. Preferably these units also include the lock release feature mentioned above but such units and their assembly are advantageous irrespective of the presence of this feature. In the following description the invention is explained illustratively in terms of a railway car door. In the accompanying drawings:

FIGURE 1 is an elevation of a railway freight car side door made of extruded aluminum sections.

FIGURE 2 is an upright section on line 2—2 of FIGURE 1 but broken away in part and drawn to an enlarged scale.

FIGURE 3 is a section through two adjacent extruded units during a step in their assembly with each other.

FIGURE 4 shows a series of assembled units showing a step in the separation of the assembled sections.

FIGURE 5 corresponds to one of the joints shown in FIGURE 4 but illustrates another form of the invention.

FIGURE 5a is a detail elevation of the lower margin of flange 11 taken on line 5a—5a of FIGURE 5.

FIGURE 6 corresponds to FIGURES 4 and 5 but illustrates another form of the invention, embodied in extrusion units forming box sections when assembled.

FIGURE 7 is a cross sectional view taken along the line 7—7 of FIGURE 6.

FIGURE 8 is an enlarged sectional view through two adjacent extruded units of the embodiment shown in FIGURES 6 and 7 during a step in their assembly to each other.

FIGURE 9 is a view similar to FIGURES 4 and 6 showing a still further embodiment of the invention.

The door shown in FIGURE 1 comprises a frame having a bottom rail 1, a top rail 2 and side rails 3 which may be formed of aluminum, steel or other metal, and in themselves do not form an essential part of the present invention. Extending between opposite side rails 3 are a plurality of units 5 each formed of extruded aluminum and consisting of a plate-like body 6 with reinforcing ribs 7 at intervals throughout its width. The longitudinal marginal portions comprise webs 8, 9 normal to the body and having terminal flanges 10, 11 respectively. Flange 10 is parallel to body panel 6, or at an angle of 90° to the web, and projects forwardly from web 8 beyond the edge of the body and terminates in an inturned lip 12 facing rearwardly toward the web. Flange 11 diverges slightly from panel 6, being at an angle of approximately 93° to the web, and projects rearwardly from the web abreast of the body and terminates in an outermost corner 13 adapted to oppose and interengage lip 12 on an adjacent unit when the two units are assembled, first as shown in FIGURE 3, and then after rotation in the direction of arrows A, B, as shown in FIGURE 4. The pivotal connection between the adjacent units is effected by a projecting bead 15, having a convex contour at the base of web 8, and a concave groove 17 at the base of web 9. Bead 15 is readily received in grooves 17 and forms therewith a pivot joint about which the units may swing.

When the adjacent units are swung from the position shown in FIGURE 3 to that shown in FIGURE 4, the elements 12 and 13 are forced past each other and the two angular marginal portions 8, 10 and 9, 11 snap into the position shown in FIGURE 4, forming a friction interlocked joint which will not separate or loosen under normal usage. The friction interlock is due to the fact that the critical width X of flange 10 between web 8 and lip 13 is the same as the critical width Y of flange 11 between web 9 and the flange outermost corner 12, whereby when flange 8 is forced to a 90° angle with web 9, instead of its original 93° angle, the metal is distorted by the interengagement of elements 12 and 13. The interlock also results in part from the straight line from the contour of interengaging faces of elements 15, 17 which prevents their separation by pivotal movement about the interengaged edges of flanges 10 and 11.

The joint formed between the angular internested marginal elements of the units is so tight that pressure in opposite directions on adjacent units tending to rotate the adjacent units about elements 15, 17 in a direction opposite to arrows A, B (FIGURE 3) will not be effective.

As indicated above, it may be important to be able to separate the units, and for this purpose there are provided spaced elements along the joint at the outer edges of flanges 10, 11 constituting a crevice between them. In FIGURES 2–4 the spaced elements result from the addition of an extension 19 on flange 11 inclined downwardly from or spaced from the plane of the outer face of flange 11, so as to provide clearance below the lowermost face of lip 12. This accommodates the end of a screwdriver or other wedging tool T between the projection and lip 12 and, upon insertion or rotation of the tool, flanges 10, 11 may be separated without damage and the units 5 freed to disassembling relation, thus effecting one objective of the present construction.

The ends of units 5 are riveted, or welded, to the door side rails 3 and the top and bottom units are secured to the door bottom and top rails 1 and 2.

In FIGURE 5 the same result is attained by sawing or otherwise forming a series of notches 21 at intervals along the outer edge of flange 11' into which the end of the prying or wedging tool may be inserted, as indicated by the arrow C, and without interfering with the holding effect of the contact between the extreme outer corner of flange 11' and the opposing lip 12' on flange 10'.

FIGURES 6, 7 and 8 illustrate the same general principle incorporated in deep channel section extruded metal units 31, 32, 33 adapt 1 when assembled to form a plurality of double plates or box section panels which would possess greater transverse strength than the single plate bodies previously described and would have the additional advantage of forming closed air chambers for insulation between the forward and rear faces. Each of these sections would include parallel walls 35, 36 spaced apart and a connecting web 37. Wall 35 will have a downwardly projecting convex bead 39 at its lower end and a correspondingly concave groove 40 at its upper end. This bead and groove on adjacent units provide for their pivotal assembly, when the upper unit moves in the direction of arrow C, similar to the pivot assembly of the units shown in FIGURES 3 and 4. The lower end of wall 36 terminates in a downwardly projecting flange 42 with an inturned lip 43 facing toward web 37. The upper end of wall 35 terminates in a downturned shoulder 45 disposed to engage and interlock with the corresponding lip 43 on an adjacent unit. This interlock would be substantially the same as that resulting from interengagement of lip 12 and corner 13 shown in FIGURE 4. The upper end of wall 36 at the open margin of the unit may distort as shown in broken lines in FIGURE 8 to permit the passing of flange 42 past shoulder 45 to interlocking position. When the two units are assembled, the transverse web 37 of one unit will combine with the walls 35, 36 and web 37 of the adjacent unit to form a hollow, tightly enclosed box section. Additional reinforcing ribs 47, 48 may be provided as indicated if the depth of walls 35, 36 is such that reinforcement is desirable.

Units 31, 32 and 33 extend the full length of the door and are riveted or otherwise secured at their ends to door upright front and rear members 46, 49 respectively. If a door unit is damaged, its ends are separated from members 46, 49 and a prying tool inserted in recess R at intervals along the door between adjacent unit walls 36, 36 and the latter disengaged from each other so that the units may be separated by pivotal movement in the opposite direction to that indicated by arrow D.

The end portion of wall 36 which forms shoulder 45 is offset inwardly far enough away from the edge of the wall to provide ample clearance at R for the insertion of the end of an edged prying tool to separate the interlocked elements as previously described.

FIGURE 9 illustrates another form of panel units arranged when assembled to form a plurality of box section panels which are readily separated for repair or replacement. The assembly possesses the advantages inherent in the structure of FIGURE 6 and embodies a more positive interlock between successive panels. In addition, the structure would better resist external loads without unlocking. The general contour of each unit is similar to that shown in FIGURE 6, having inner and outer walls 50, 51, a bottom wall 53, reinforcing ribs 54 and a downwardly projecting rib 55, forming an offset extension of wall 50, and a downwardly projecting flange 56 forming an offset extension of wall 51. The upper end of wall 50 has a recess 57 disposed to receive the projection 55a on rib 55 of the next higher unit. The upper end of wall 51 has an inwardly offset reentrant angle shoulder 58 disposed to engage a similarly shaped shoulder 59 on depending flange 56 of the next higher unit.

While elements 55, 57 correspond generally to elements 59, 40 of FIGURE 6, the presence of the unresisting web 53 between the outwardly facing elements 55, 56 and distortible inwardly facing margins of the lower unit, as distinguished from being between overlapping elements as shown at 39, 42 in FIGURE 6, makes the assembly better resistant to forces applied in opposite directions to the exterior of the unit.

To release the interlocked parts, a pressure tool P is inserted in grooves 61 in the adjacent ends of walls 51 of two units and the tool is actuated to disengage the interengaged reentrant angle shoulders 58, 59 by relative vertical movement rather than by relative pivotal movement.

The above detailed description relates to railway car doors with elongated units extending horizontally, but it will be understood that the units may be assembled to form wall-like structures for highway trailers, walk-in refrigerators and buildings and that the units may extend vertically and that details of the units and their assembly may be varied otherwise than as described while including the spirit of the invention. The exclusive use of those modifications of the invention coming within the scope of the claims is contemplated.

I claim:

1. A structure formed of a plurality of elongated panel forming units each comprising substantially parallel spaced apart walls and a transverse web between them, curved tongue and groove elements on opposite longitudinal marginal portions respectively of one wall and arranged to pivotally interengage with corresponding curved groove and tongue elements on juxtaposed units upon relative rotation of the units about their interengaged tongue and groove elements, reversely facing straight sided hook-like elements on opposite marginal portions respectively of the other wall extending at angles not exceeding 90° to the exterior face of said other wall and arranged to positively interengage corresponding hook-like elements on juxtaposed units upon said relative rotation of the units to interlock the units to each other with their walls in common planes, one of the hook-like elements being on the outer face of the unit wall from which it projects and the other hook-like element being on the inner face of said unit wall, there being a wide recess between said hook-like elements providing clearance between the interengaged hook-like elements to receive an edged tool for prying the interlocked hook-like elements apart.

2. A railway house car door formed of a plurality of panel units of extruded material, each unit comprising a deep channel section with substantially parallel walls and a connecting web, the remote marginal portions of one wall of each unit having respectively a convex tongue element and a concave groove element arranged to rotatably coact with similar groove and tongue elements on a juxtaposed unit, the remote marginal portions of the other wall of each unit having flat rigid shoulders projecting inwardly and outwardly respectively and each perpendicular to said wall and arranged to abut and to engage complementary shoulders on a juxtaposed unit when the units are swung about their coacting tongue and groove elements to positively interlock the units and a pair of spaced upright members at the front and rear peripheral edges of said units affixed to said units.

3. A wall forming unit comprising a front body plate, a rear body plate, said plates being spaced apart and substantially parallel and coextensive and terminating along an open margin of the unit in elements having grooved outturned faces, a cross web between said plates along and closing the opposite margin of the unit and holding the adjacent portion of the plates rigidly spaced, projections on said plates extending beyond said cross web at opposite sides of the unit and having grooved inturned faces, the over-all distance over said outturned faces being slightly greater than the distance between said inturned faces, whereby the closed margin of the unit when applied to the open margin of a duplicate unit will overlap and confine the elements with outturned faces along the margin of the duplicate unit and interlock therewith, there being a recess between the units for receiving a unit separating tool.

4. A unit for use in a multi-unit wall-like structure comprising a one-piece body with a pair of marginal members extending along each of two opposite edges of the unit and spaced apart a substantial distance transversely of the body, one pair of members having bearing elements facing outwardly of the unit and away from each other transversely of said body and the other pair of members having bearing elements facing inwardly of the unit and toward each other transversely of the body, the latter pair of elements being disposed to receive between them and to interlock with corresponding outwardly facing elements upon a juxtaposed unit, there being a recess provided in one member of each pair of marginal members arranged and adapted to receive a portion of a forcing tool inserted between juxtaposed units for separating interlocked elements of juxtaposed units.

5. A unit adapted to form part of a multi-unit wall-like structure, comprising a body extending a substantial distance in a general plane and having spaced parallel margins, there being members with bearing surfaces extending along each of said margins and spaced apart transversely of said general plane, the bearing surfaces on the members along one of said margins facing toward each other, and the bearing surfaces on the members along the other of said margins facing toward each other, the distance between said surfaces facing toward each other being slightly less than the distance over said surfaces facing away from each other, said member having interfitting grooves and ridges respectively whereby the assembly of the unit with a similar unit may be effected by inserting the spaced apart members along one margin of one unit between the spaced apart members of the other margin of the other unit and thereby distorting one or more of said members to interengage the adjacent grooves and ridges whereby the juxtaposed members of the two units are interlocked, there being an element on at least one member of each pair of juxtaposed members spaced from the bearing surface to receive a prying tool for separating the unit from a unit interlocked therewith.

References Cited
UNITED STATES PATENTS

| | | | |
|---|---|---|---|
| 2,699,128 | 1/1955 | Johnson | 52—579 X |
| 3,042,157 | 7/1962 | Dorfman | 52—579 X |
| 3,093,219 | 6/1963 | Ramme | 52—579 X |
| 3,111,203 | 11/1963 | De Ridder | 52—588 |

FRANK L. ABBOTT, *Primary Examiner.*

P. C. FAW, *Assistant Examiner.*